US007493609B2

(12) United States Patent
Tal et al.

(10) Patent No.: US 7,493,609 B2
(45) Date of Patent: Feb. 17, 2009

(54) METHOD AND APPARATUS FOR AUTOMATIC SECOND-ORDER PREDICTIVE COMMONING

(75) Inventors: Arie Tal, Toronto (CA); Dina Tal, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1007 days.

(21) Appl. No.: 10/929,589

(22) Filed: Aug. 30, 2004

(65) Prior Publication Data

US 2006/0048115 A1 Mar. 2, 2006

(51) Int. Cl.
*G06F 9/45* (2006.01)

(52) U.S. Cl. ....................... 717/154; 717/155; 717/151; 717/152; 717/160; 717/161

(58) Field of Classification Search .......... 717/151–161
See application file for complete search history.

(56) References Cited

U.S. PATENT DOCUMENTS 4,656,583 A 4/1987 Auslander et al. ........... 364/300
5,107,418 A * 4/1992 Cramer et al. .............. 717/155
5,369,766 A 11/1994 Nakano et al. .............. 395/700
5,704,053 A * 12/1997 Santhanam ................. 717/158
5,901,318 A * 5/1999 Hsu ........................... 717/161
6,002,879 A 12/1999 Radigan et al. ............. 395/789
6,286,135 B1 * 9/2001 Santhanam ................. 717/146
6,314,562 B1 11/2001 Biggerstaff ..................... 717/9
6,343,375 B1 1/2002 Gupta et al. ..................... 717/9
6,381,740 B1 4/2002 Miller et al. ..................... 717/9
6,675,374 B2 * 1/2004 Pieper et al. ................ 717/141
2002/0100031 A1 7/2002 Miranda et al. ............. 717/152
2003/0005419 A1 * 1/2003 Pieper et al. ................ 717/141

OTHER PUBLICATIONS

O'Brian, "Predictive Commoning: A method of optimizing loops containing references to consecutive array elements" Apr. 26, 1990, IBM Thomas J. Watson Research Center, pp. 1-12.*
U.S. Appl. No. 10/314,094, Archambault, Optimizing Source Code for Iterative Execution, filed Dec. 5, 2002.

* cited by examiner

*Primary Examiner*—Lewis A. Bullock, Jr.
*Assistant Examiner*—Jason Mitchell
(74) *Attorney, Agent, or Firm*—Duke W. Yee; Libby Z. Handelsman; Gerald H. Glanzman

(57) ABSTRACT

A method and apparatus for automatic second-order predictive commoning is provided by the present invention. During an analysis phase, the intermediate representation of a program code is analyzed to identify opportunities for second-order predictive commoning optimization. The analyzed information is used by the present invention for apply transformations to the program code, such that the number of memory access and the number of computations are reduced for loop iterations and performance of program code is improved.

3 Claims, 8 Drawing Sheets

Figure 1
(Prior Art)
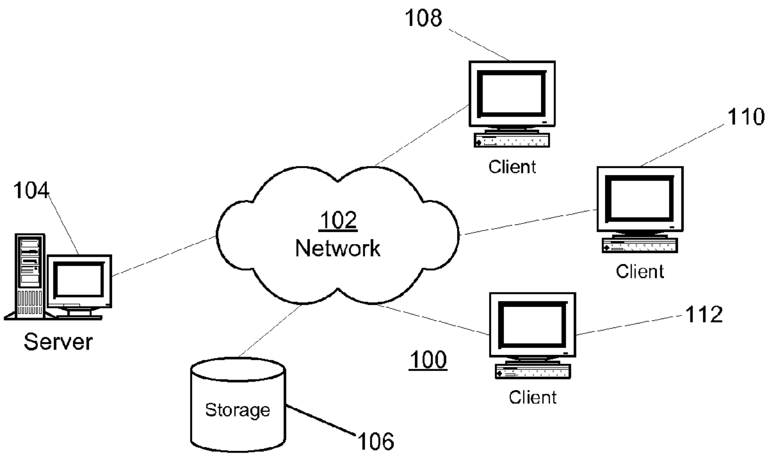
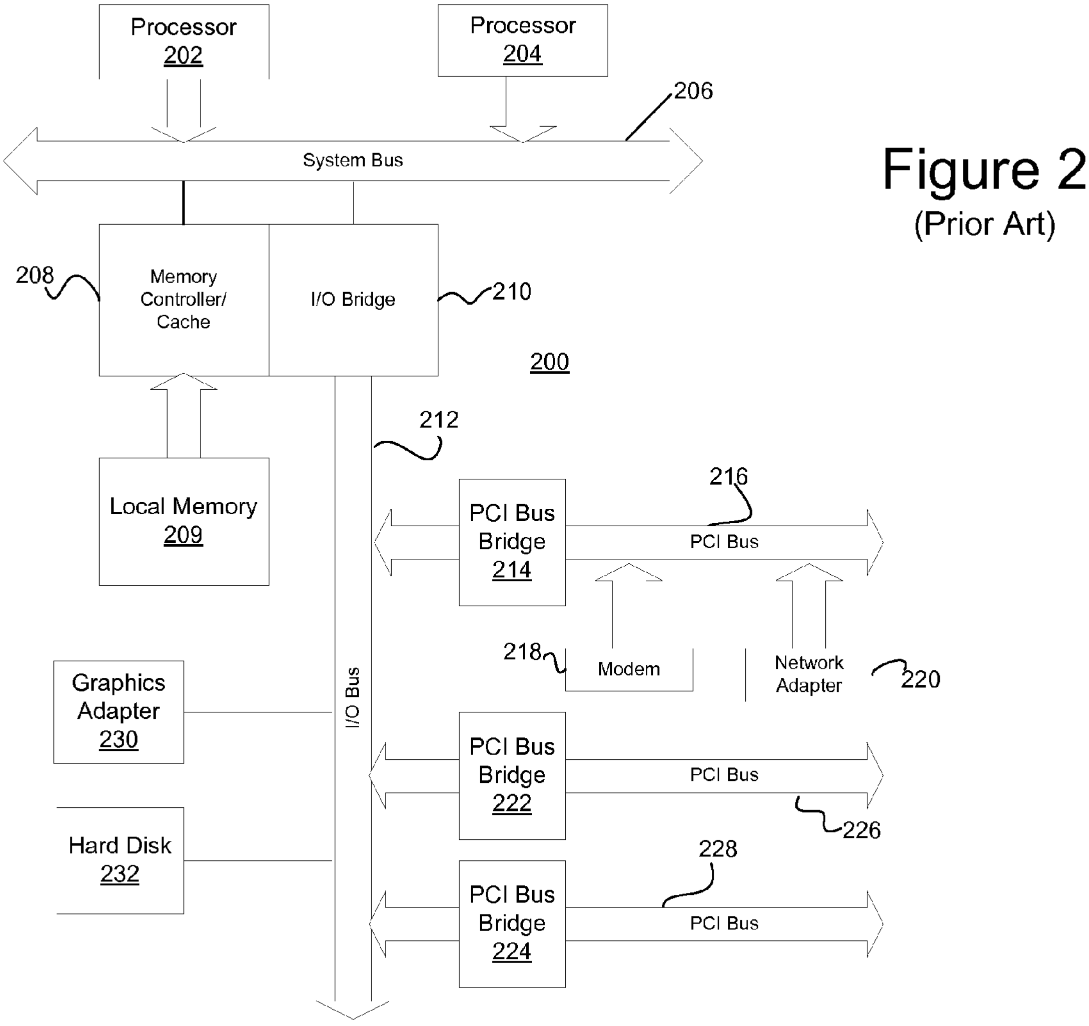
Figure 2
(Prior Art)

Figure 6

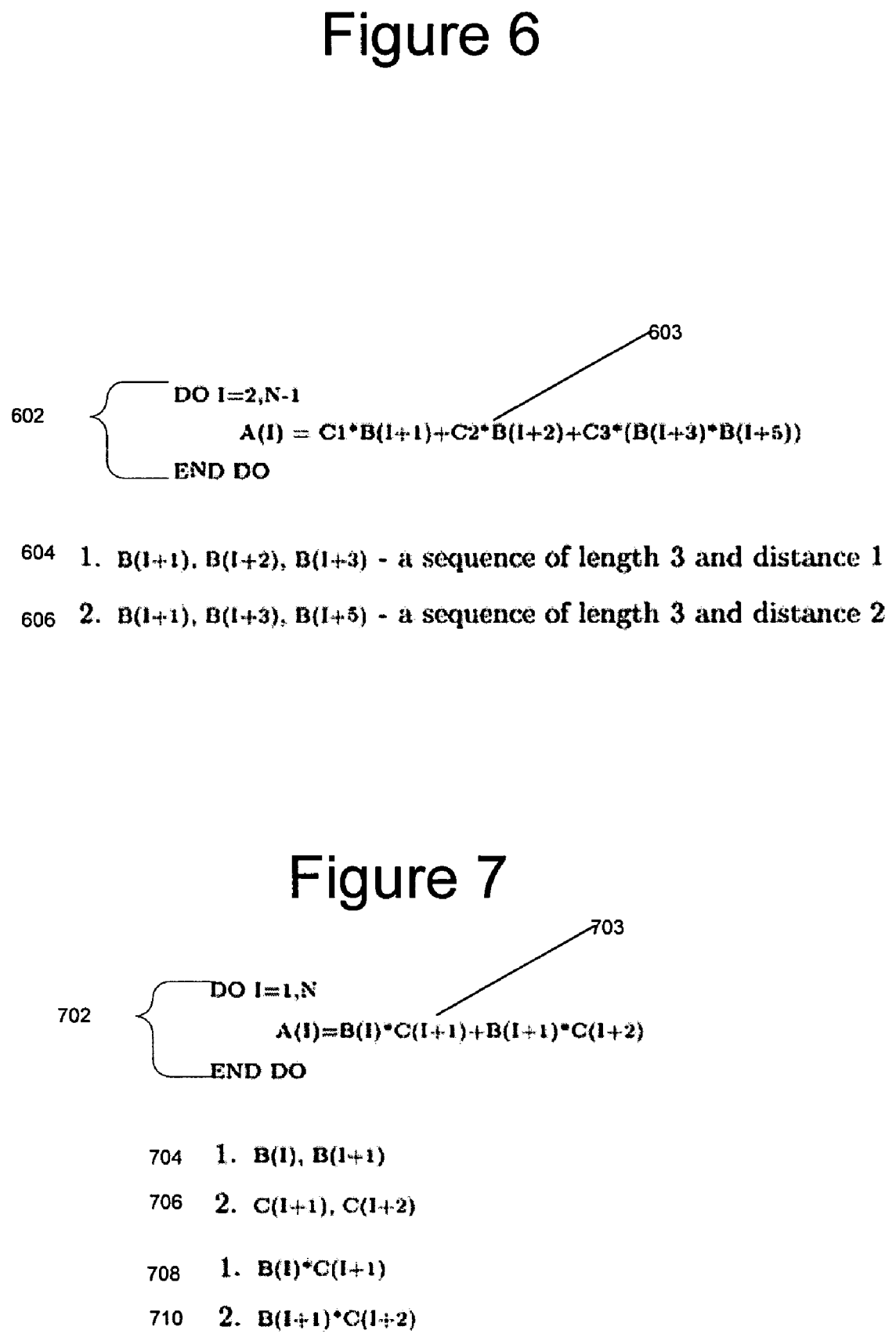

602 {
DO I=2,N-1
    A(I) = C1*B(I+1)+C2*B(I+2)+C3*(B(I+3)*B(I+5))   ←603
END DO
}

604  1. B(I+1), B(I+2), B(I+3) - a sequence of length 3 and distance 1

606  2. B(I+1), B(I+3), B(I+5) - a sequence of length 3 and distance 2

Figure 7

702 {
DO I=1,N
    A(I)=B(I)*C(I+1)+B(I+1)*C(I+2)   ←703
END DO
}

```
                                   803
802  DO I=2,N
        A(I)=B(I-1)+B(I+1)
     END DO

804  B(I - 1)  { R1
               { R2
806  B(I + 1)  { R3
               { R4
```

```
902 R1=B(1) }
903 R2=B(2) }          <- Temporary variable initializations
    DO I=2,N-MOD(N,4),4

    904 R3=B(I+1)      <- Feeder load
    912 A(I)=R1+R3 905
    906 R4=B(I+2)      <- Feeder load
    914 A(I+1)=R2+R4 907
    908 R1=B(I+3)      <- Feeder load
    916 A(I+2)=R3+R1 909
    910 R2=B(I+4)      <- Feeder load
    918 A(I+3)=R4+R2 911
    END DO
  <Loop residue code goes here>
```

```
DO I3=2,N-1
      DO I2=2,N-1
         DO I1=2,N-1
            U(I1,I2,I3)=U(I1,I2,I3)
               +C(0)*( R(I1, I2, I3 ) )
               +C(1)*( R(I1-1,I2, I3 ) + R(I1+1,I2, I3 )
                  + R(I1, I2-1,I3 ) + R(I1, I2+1,I3 )
                  + R(I1, I2, I3-1) + R(I1, I2, I3+1) )
               +C(2)*( R(I1-1,I2-1,I3 ) + R(I1+1,I2-1,I3 )
                  + R(I1-1,I2+1,I3 ) + R(I1+1,I2+1,I3 )
                  + R(I1, I2-1,I3-1) + R(I1, I2+1,I3-1)
                  + R(I1, I2-1,I3+1) + R(I1, I2+1,I3+1)
                  + R(I1-1,I2, I3-1) + R(I1-1,I2, I3+1)
                  + R(I1+1,I2, I3-1) + R(I1+1,I2, I3+1) )
               +C(3)*( R(I1-1,I2-1,I3-1) + R(I1+1,I2-1,I3-1)
                  + R(I1-1,I2+1,I3-1) + R(I1+1,I2+1,I3-1)
                  + R(I1-1,I2-1,I3+1) + R(I1+1,I2-1,I3+1)
                  + R(I1-1,I2+1,I3+1) + R(I1+1,I2+1,I3+1) )
         END DO
      END DO
END DO
```

Figure 2: psinv with sequencing annotation

1020

```
DO I3=2,N-1
      DO I2=2,N-1
         DO I1=2,N-1
            U(I1,I2,I3)=U(I1,I2,I3)
               +C(0)*( R(I1, I2, I3 ) )
               +C(1)*( R(I1-1,I2, I3 ) + R(I1+1,I2, I3 )
                  + R(I1, I2-1,I3 ) + R(I1, I2+1,I3 )
                  + R(I1, I2, I3-1) + R(I1, I2, I3+1) )
               +C(2)*( R(I1-1,I2-1,I3 ) + R(I1+1,I2-1,I3 )
                  + R(I1-1,I2+1,I3 ) + R(I1+1,I2+1,I3 )
                  + R(I1, I2-1,I3-1) + R(I1, I2+1,I3-1)
                  + R(I1, I2-1,I3+1) + R(I1, I2+1,I3+1)
                  + R(I1-1,I2, I3-1) + R(I1-1,I2, I3+1)
                  + R(I1+1,I2, I3-1) + R(I1+1,I2, I3+1) )
               +C(3)*( R(I1-1,I2-1,I3-1) + R(I1+1,I2-1,I3-1)
                  + R(I1-1,I2+1,I3-1) + R(I1+1,I2+1,I3-1)
                  + R(I1-1,I2-1,I3+1) + R(I1+1,I2-1,I3+1)
                  + R(I1-1,I2+1,I3+1) + R(I1+1,I2+1,I3+1) )
         END DO
      END DO
END DO
```

Figure 3: psinv after applying Second-Order Predictive Commoning

```
DO I3=2,N-1
    DO I2=2,N-1
1102
        R0=R(1,I2,I3)
        R1=R(2,I2,I3)
        R3=R(1,I2-1,I3-1)+R(1,I2+1,I3-1)+R(1,I2-1,I3+1)+R(1,I2+1,I3+1)
        R4=R(2,I2-1,I3-1)+R(2,I2+1,I3-1)+R(2,I2-1,I3+1)+R(2,I2+1,I3+1)
        R6=R(1,I2-1,I3 )+R(1,I2+1,I3 )+R(1,I2, I3-1)+R(1,I2, I3+1)
        R7=R(2,I2-1,I3 )+R(2,I2+1,I3 )+R(2,I2, I3-1)+R(2,I2, I3+1)
        DO I1=2,N-1-MOD(N-2,3),3
1104
            R2=R(I1+1,I2,I3)
            R5=R(I1+1,I2-1,I3-1)+R(I1+1,I2+1,I3-1)+
                R(I1+1,I2-1,I3+1)+R(I1+1,I2+1,I3+1)
            R8=R(I1+1,I2-1,I3)+R(I1+1,I2+1,I3)+R(I1+1,I2, I3-1)+
                R(I1+1,I2, I3+1)
1110
            U(I1,I2,I3)=U(I1,I2,I3)+
                C(0)*R1+C(1)*(R0+R2+R4)+C(2)*(R3+R5+R7)+
                C(3)*(R6+R8)
1106
            R0=R(I1+2,I2,I3)
            R3=R(I1+2,I2-1,I3-1)+R(I1+2,I2+1,I3-1)+
                R(I1+2,I2-1,I3+1)+R(I1+2,I2+1,I3+1)
            R6=R(I1+2,I2-1,I3)+R(I1+2,I2+1,I3)+R(I1+2,I2, I3-1)+
                R(I1+2,I2, I3+1)
1112
            U(I1,I2,I3)=U(I1,I2,I3)+
                C(0)*R2+C(1)*(R1+R0+R5)+C(2)*(R4+R3+R8)+
                C(3)*(R7+R6)
1108
            R1=R(I1+3,I2,I3)
            R4=R(I1+3,I2-1,I3-1)+R(I1+3,I2+1,I3-1)+
                R(I1+3,I2-1,I3+1)+R(I1+3,I2+1,I3+1)
            R7=R(I1+3,I2-1,I3 )+R(I1+3,I2+1,I3)+R(I1+3,I2, I3-1)+
                R(I1+3,I2, I3+1)
1114
            U(I1,I2,I3)=U(I1,I2,I3)+
                C(0)*R0+C(1)*(R2+R1+R3)+C(2)*(R5+R4+R6)+
                C(3)*(R8+R7)
        END DO
        DO I1=MAX(2,N-1-MOD(N-2,3)),N-1
            <original loop body>
        END DO
    END DO
END DO
```

METHOD AND APPARATUS FOR AUTOMATIC SECOND-ORDER PREDICTIVE COMMONING

BACKGROUND OF THE INVENTION

1. Technical Field

The present invention relates to an improved data processing system. In particular, the present invention relates to loop optimization transformation in software applications. Still more particularly, the present invention relates to reducing memory access latency and number of computations in a program using automatic second-order predictive commoning.

2. Description of Related Art

A compiler is a program that executes in a data processing system, which translates a high-level language program into a functionally equivalent low-level language program, such as machine language instructions. In the process of compilation, the compiler optimizes the source program by generating an explicit intermediate representation and performing code optimization.

Currently, most well-known code optimization techniques are designed towards reducing memory access latency. Memory access latency is often caused by reading from or writing to a large number of memory addresses during iterations of program loops. Memory access latency causes the processor to stall until required data is retrieved from memory.

In some applications, such as stencil algorithms that are used to iteratively solve partial differential equations, memory elements retrieved in an iteration of a loop may also be required in one or more immediate subsequent iterations of the loop. Such application requires the same elements to be retrieved from memory or cache repeatedly until they are no longer needed.

As mentioned in patent application entitled "Optimizing Source Code for Iterative Execution", filed on Dec. 19, 2001, U.S. application Ser. No. 10/314,094, herein incorporated by reference, predictive commoning is a loop optimization transformation technique that identifies access to memory elements that are required in immediate subsequent iterations. By identifying these elements, storing the content of these elements in registers, and using the registers in subsequent iterations, many redundant memory accesses are saved. In addition, predictive commoning may also unroll a transformed loop, such that software register renaming can be applied. Software register renaming is applied to avoid the need to copy values between registers.

Second-order predictive commoning is a more complex loop optimization transformation technique that identifies sub-expressions and combinable sub-expressions. The results of the computation of sub-expressions or combination sub-expressions can be reused in immediate subsequent iterations, such that not only the number of memory accesses is reduced, computations, such as multiplications, additions, function calls with no side effects, may be saved.

Three-dimensional stencil programs, such as subroutine "psinv" and "resid" in mgrid from the SPEC2000 benchmark, include opportunities for second-order predictive commoning to save computations of combinable sub-expressions. These sub-expressions carry the combined sum of certain memory elements over to the next iteration. Instead of storing and retrieving separate references to and from registers, only sums of combined sub-expressions are stored in registers. In this way, not only is the number of memory accesses reduced, the number of operations required is also reduced. When the number of operations is reduced, performance of the program is also improved However, existing solutions, including TOBEY, a compiler product available from International Business Machines Corporation, are limited to analysis of first-order predictive commoning, which handles strictly single memory references. Therefore, it would be advantageous to have a method and apparatus that automatically analyzes the intermediate representation of a program code to identify opportunities of second-order predictive commoning and perform necessary transformations for optimization.

SUMMARY OF THE INVENTION

A method, apparatus and computer instructions is provided for automatic second-order predictive commoning. The mechanism of the present invention analyzes the intermediate representation of a program and identifies opportunities for second-order predictive commoning. Once analysis is complete, the mechanism of the present invention uses the analyzed information to perform transformations on the program code to create second-order predictive commoning optimization.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which the present invention may be implemented;

FIG. 2 is a block diagram of a data processing system that may be implemented as a server in accordance with a preferred embodiment of the present invention;

FIG. 6 is a diagram illustrating an example of detecting sequences with maximal coverage in accordance with a preferred embodiment of the present invention;

FIG. 7 is a diagram illustrating an example of identifying parallel elements that have common ancestors with common operations in accordance with a preferred embodiment of the present invention;

FIG. 8 is an example of adding temporary variables representing sequence elements in accordance with a preferred embodiment of the present invention;

FIG. 9 is an example of applying transformation with predictive commoning in accordance with a preferred embodiment of the present invention;

FIG. 10 is a diagram illustrating an exemplary original loop nest from the 'psinv' subroutine in mgrid of the SPEC2000 benchmark in accordance with a preferred embodiment of the present invention; and FIG. 11 is a diagram illustrating an exemplary optimized loop nest of the 'psinv' subroutine after applying transformation with second-order predictive commoning in accordance with a preferred embodiment of the present invention.

DETAILED DESCRIPTION OF THE PREFERRED EMBODIMENT

Figure 3:
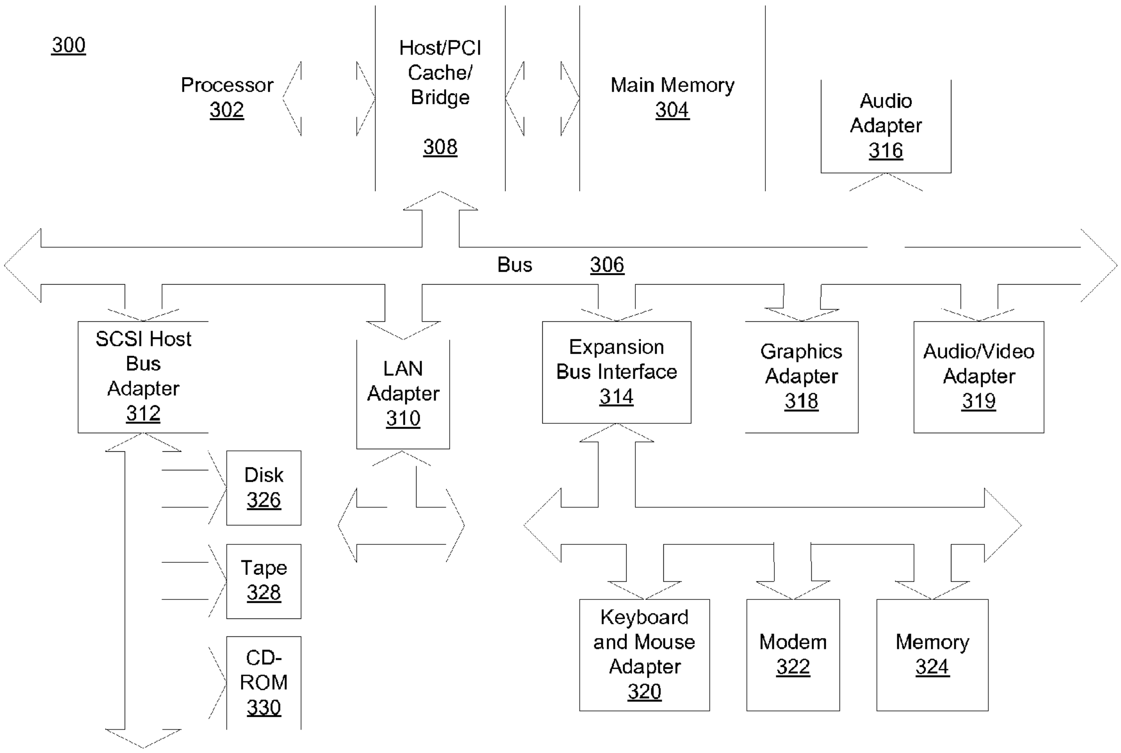
FIG. 3 is a block diagram illustrating a data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, New York, running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus and computer instructions for automatic second-order predictive commoning. The mechanism of the present invention first analyzes the intermediate representation of a program to identify opportunities for second-order predictive commoning. In the present invention, second-order predictive commoning is designed to handle general forms of indexed expressions, including calls to functions within parameters that are expressions based on loop induction variables.

The analysis performed by the mechanism of the present invention includes collecting induction variable references into a half Lattice, determining distances between sub-expressions, detecting sequences with maximal coverage, maximizing sub-expressions to handle re-associations, and eliminating redundant sequences.

After the analysis is complete, the mechanism of the present invention applies transformations to the program code and generates an optimized program with second-order predictive commoning. The transformations include determining whether to perform unrolling based on register pressure estimates, adding temporary variables representing sequence elements; inserting temporary variable initializations, inserting feeder statements, replacing sub-expressions with temporary variables, and rotating temporary variable references if unrolling is performed or rotating temporary variable values if unrolling is not performed.

Thus, by using the mechanism of the present invention, opportunities for second-order predictive commoning are identified and transformations are applied, such that values and computations of previous iteration of a loop may be reused in its subsequent iterations. As a result, memory bandwidth and computation overhead are greatly reduced, which leads to improvement in performance of the program.

Figure 4:
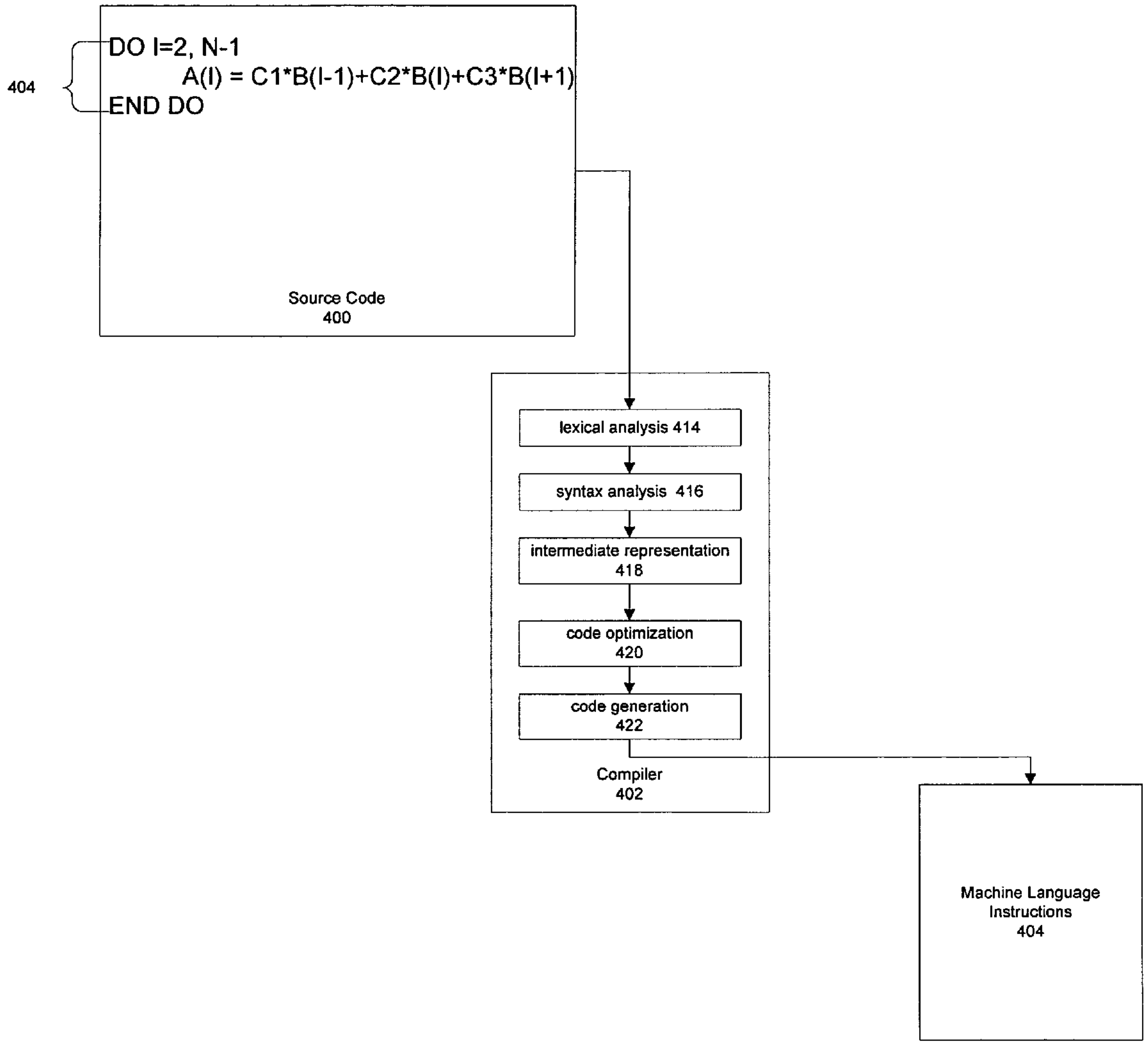
FIG. 4 is a diagram illustrating relationships between a source program, a compiler, and machine language instructions in a preferred embodiment of the present invention.

Turning now to FIG. 4, a diagram illustrating relationships between a source program, a compiler, and machine language instructions is depicted in a preferred embodiment of the present invention. As illustrated in FIG. 4, in this illustrative example, a user, such as a programmer, may define source program 400. Source program 400 includes variables and procedures. In this example, source program 400 includes procedure 404, which is a loop that contains multiplications and additions.

After source program 400 is defined, a programmer may compile source program 400 using compiler 402. Compiler 402 may be implemented in a data processing system, such as data processing system 200 in FIG. 2 or data processing system 300 in FIG. 3. Examples of compilers include IBM XL C/C++ v.7.0 compiler and IBM XL Fortran v9.1 compiler, which are products available from International Business Machines Corporation.

In the compilation process, compiler 402 processes source program 400 in several phases: lexical analysis phase 414, syntax analysis phase 416, intermediate representation phase 418, code optimization phase 420, and code generation phase 422.

Lexical analysis phase 414 analyzes source program 400. In this phase, compiler 402 reads characters in source program 400 and groups them into streams of tokens representing logically cohesive sequence of characters, such as identifiers, operators, and keywords.

Syntax analysis 416 imposes a hierarchy structure on the token string. During syntax analysis 416, compiler 402 obtains the string of tokens from lexical analysis 414 and determines whether the string is a valid construct of the source language by either performing top-down parsing or bottom-up parsing.

Once lexical and syntax analysis are complete, compiler 402 generates an explicit intermediate code representation 418 of source program 400, which may take a variety of forms. For example, an intermediate code representation may be a call graph, a data flow graph, or a control flow graph.

In code optimization phase 420, compiler 402 performs various transformations in order to improve intermediate representation. These transformations include loop transformations, such as, loop tiling and strip mining. These transformations improve performance of the target machine code.

In a preferred embodiment, the present invention analyzes the intermediate representation and identifies opportunities for second-order predictive commoning during the code optimization phase. After the analysis is complete, the present invention uses the analyzed information to apply transformations on the program code and generates optimized code with second-order predictive commoning.

Finally, compiler 402 generates target machine code by selecting memory locations for each variable used by the program. Each intermediate instruction is translated into a sequence of machine language instructions, such as machine language instructions 404 that performs the same task. Machine language instructions 404 may be for a specific platform, such as, a UNIX platform. A programmer may then execute these instructions on the specific platform with improved performance.

As mentioned above, the mechanism of the present invention analyzes the intermediate representation of a program code to identify opportunities for second-order predictive commoning. In order to identify opportunities, the mechanism of the present invention first examines all the expressions and sub-expressions in the innermost loop of the program and organizes them into a finite half Lattice. A Lattice, L(i<), is a representation defined for all sub-expressions of the innermost loop, where i is the loop's induction variable. A full Lattice has both a single top and a single bottom. A half Lattice only has a single bottom.

The mechanism of the present invention collects induction variable references into a Lattice and creates a local value-numbering table for the expressions and sub-expressions in the loop and for each node. The local value-numbering table maintains a set of attributes as bit vectors, which means that a bit corresponding to a sub-expression's value-number will be turned on if the sub-expression belongs to a set described by the attribute.

The set of attributes includes immediately-referenced-by, immediately-references, referenced-by, and references. Immediately-referenced-by is a set containing all the sub-expressions in the Lattice that immediately reference the node's sub-expression. Immediately-references is a set containing all the sub-expressions in the Lattice that are immediately referenced by this node's sub-expression.

Referenced-by is computed as a transitive-closure of the immediately-referenced-by attribute (added for compiler performance), which means that it includes all the sub-expressions that contain a reference to the node's super-expression. References is computed as a transitive-closure of the immediately-references attribute (added for compiler performance), which means that it includes all the sub-expressions that this node's sub-expression references.

Figure 5:
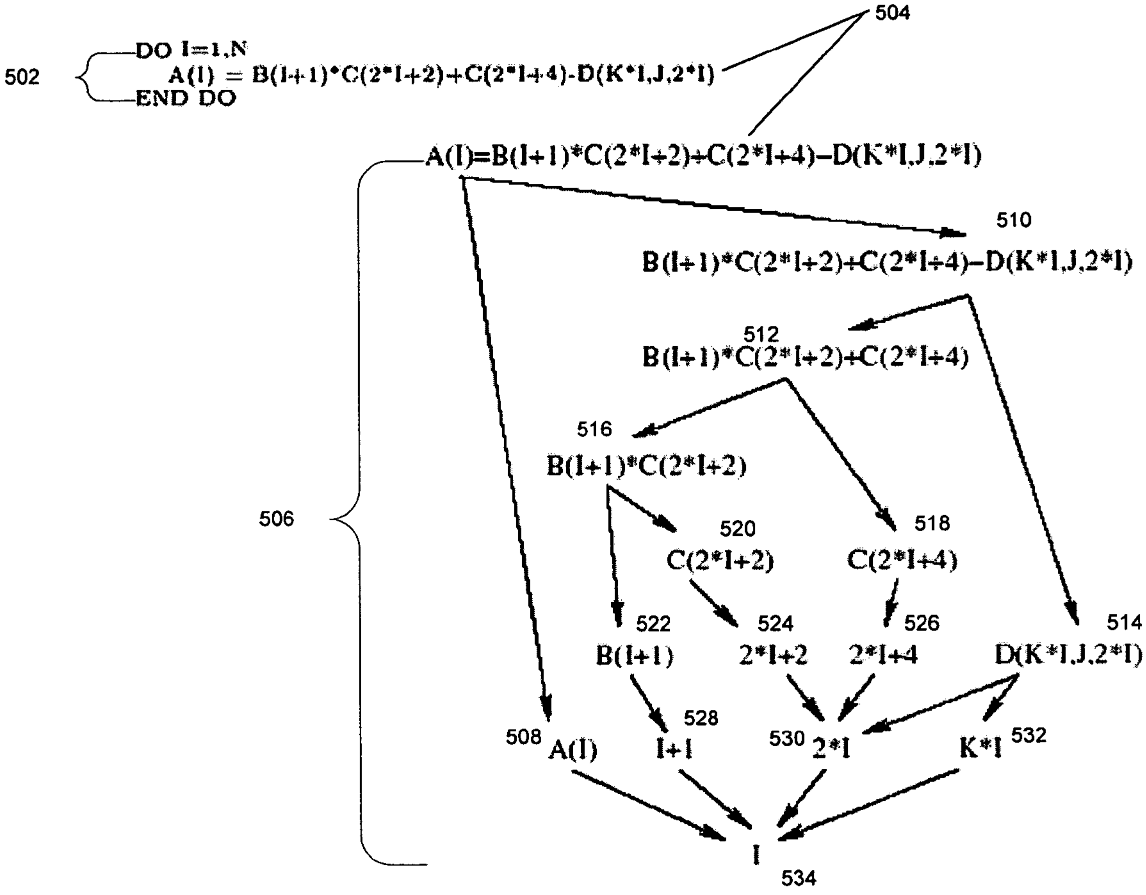
FIG. 5 is a diagram illustrating an example of a loop and its corresponding Lattice in accordance with a preferred embodiment of the present invention.

Turning now to FIG. 5, a diagram illustrating an example of a loop and its corresponding Lattice is depicted in accordance with a preferred embodiment of the present invention. As depicted in FIG. 5, in this example, loop 502 includes a single expression, expression 504, A(I)=B(I+1)*C(2*I+2)+C(2*I+4)−D(K*I,J,2*I). Lattice 506 is defined for all the sub-expressions of the innermost loop.

In this example, expression 504 includes sub-expressions A(I) 508, and B(I+1)*C(2*I+2)+C(2*I+4)−D(K*I,J,2*I) 510. Sub-expression 510 includes sub-expressions B(I+1)*C(2*I+2)+C(2*I+4) 512, and D(K*I,J,2*I) 514. Sub-expression 514 includes sub-expressions B(I+1)*C(2*I+2) 516 and C(2*I+4) 518. Sub-expression 516 includes sub-expressions C(2*I+2) 520, and B(I+1) 522. Sub-expression 518 and sub-expression 520 is further broken down into sub-expressions 2*I+2 524, and 2*I+4 526.

Sub-expression 522 includes sub-expression I+1 528, and sub-expressions 524 and 526 include sub-expression 2*I 530. Sub-expression D(K*I,J,2*I) 514 also includes sub-expression 2*I 530, and sub-expression K*I 532. Each of the sub-expressions A(I) 508, I+1 528, 2*I 530, and K*I 532 includes I 534.

Also in this example, for the node D(K*I,J,2*I) 514, the corresponding attributes are: immediately-referenced-by sub-expression={B(I+1)*C(2*I+2)+C(2*I+4)−D(K*I,J,2*I)} 510; immediately-referencing={2*I 530, K*I} 532; referenced-by={B(I+1)*C(2*I+2)+C(2*I+4)−D(K*I,J,2*I) 510, A(I)=B(I+1)*C(2*I+2)+C(2*I+4)−D(K*I,J,2*I) 504}; referencing={2*I} 530, K*I 532, I 534}.

Once the induction variable references are collected into a half Lattice, the mechanism of the present invention determines the distances in the number of iterations between sub-expressions using a symbolic simplifier. Since the sequences for predictive commoning are linear in nature, the distance computation may be limited to linear functions of the induction variable. A general form of a linear function of the induction variable is a.I+b, where I is the induction variable.

In order to determine the distance given two expressions a.I+b and a'.I+b', an integer offset f has to be determined, such that a'=a and a.(I+f)+b=a'.I+b'. The mechanism of the present invention defines a set of trivial sub-expressions of I as the set of all linear functions of I. Trivial sub-expression are sub-expressions that are easy to compute and obtain no benefits when values of these sub-expressions are stored in registers throughout the loop iterations.

When computing the distances between two sub-expressions, the mechanism of the present invention makes sure that they are identical other than the trivial sub-expressions of I and contain no other references to I. For the trivial sub-expressions they are referencing, the mechanism of the present invention computes the f offset.

If two sub-expressions contain more than one trivial sub-expression, offsets f have to be the same between all their trivial sub-expressions. For example, expressions A(I+2)*B(I+1) and A(I)*B(I) are sub-expressions that contain more than one trivial sub-expression. They have different offsets defined for their trivial sub-expressions, since A(I+2) and A(I) have an offset of 2 while B(I+1) and B(I) have an offset of 1.

With the ability to determine induction variable offsets between different sub-expressions, the mechanism of the present invention detects co-linear subsets of these references or sequences with fixed distances that are both maximal and have maximal coverage. Maximal sequences are not included by any other sequence. Sequences that have maximal coverage are sequences that eliminate sequences with short distances and are covered by longer and denser sequences in terms of offset distances.

The mechanism of present invention uses an algorithm, herein referred to as algorithm for efficiently detecting maximal homogeneous numerical sequences. This algorithm analyzes a set of indexes and produces a set of all maximal fixed distance sequences. For example, a set of numbers {1,2,3,4,5} includes sequences {2,4}, {1,3,5}, and {1,2,3,4,5}. Since sequence {1,2,3,4,5} covers all members of {2,4} and {1,3,5}, sequence {1,2,3,4,5} is defined as inclusion, which is a sequence that includes all members of other sequences. A maximal sequences is defined as a sequence that is not included by any other sequence. In this example, {1,2,3,4,5} is the longest or maximal sequence. This algorithm is discussed in detail later in this application.

The mechanism of the present invention employs a limited form of this algorithm, which ignores undefined distances and limits maximal allowable distance between two subsequent elements in a sequence to some heuristically chosen value. The reason behind limiting maximal allowable distances is that large distances would cause the predictive commoning transformation to increase register pressure which gives little or no benefit to run-time performance.

Turning now to FIG. 6, a diagram illustrating an example of detecting sequences with maximal coverage is depicted in accordance with a preferred embodiment of the present invention. As depicted in FIG. 6, loop 602 includes expression A(I)=C1*B(I+1)+C2*B(I+2)+C3*(B(I+3)*B(I+5)) 603. The mechanism of the present invention detects sequences with maximal coverage by distributing elements into distances groups. In this case, there are two distance groups: B(I+1), B(I+2), B(I+3) with a distance of 1 and B(I+1), B(I+3), B(I+5) with a distance of 2.

Longest sequences within each group are chosen and sequences that are covered by some sequence are filtered out. Then, sequences that are covered by a subset of the remaining sequences prioritized by density and length are filtered out to give denser and longer sequences more chance of remaining in the resulting set of sequences.

In this example, two sequences remain in the resulting set of sequences, sequences 604 and 606. Sequence 604 includes B(I+1), B(I+2), and B(I+3), which has a length of 3 and a distance of 1. Sequence 606 includes B(I+1), B(I+3) and B(I+5), which has a length of 3 and a distance of 2.

After maximal sequences are detected, the mechanism of the present invention maximizes sub-expressions to obtain expressions that are as large as possible for reuse through loop iterations. In order to obtain such expressions, the mechanism of the present invention performs a combination of steps, including defining a family of re-associable expressions, and identifying parallel elements that have common ancestors with common operations to reduce the number of registers required and saving computations.

A family of re-associable expressions is defined. In a preferred embodiment of the present invention, four types of expressions are chosen: addition, multiplication, minimum and maximum expressions. An example of addition expression is r1+r2+r3+ . . . +rN. An example of multiplication expression is r1.r2.r3 . . . rN. An example of minimum expression is min(r1, r2, r3 . . . rN). An example of maximum expression is max(r1, r2, r3 . . . rN). These expressions are chosen, because even though if the order of elements in the expression is changed, the result of the expression remains the same.

After defining a family of re-associable expressions, the mechanism of the present invention identifies all the parallel elements from sequences of same length and distance that are members of common super-expressions. These common super-expressions must use the same operator as the families of expressions.

Turning now to FIG. 7, a diagram illustrating an example of identifying parallel elements that have common ancestors with common operations is depicted in accordance with a preferred embodiment of the present invention. As depicted in FIG. 7, loop 702 includes expression A(I)=B(I)*C(I+1)+B(I+1)*C(I+2) 703. Expression 703 includes sequence {B(I), B(I+1)} 704 and sequence {C(I+1), C(I+2)} 706.

Since these two sequences have the same distance of 1 and the same length of 2, element B(I) is therefore parallel to element C(I+1) and element B(I+1) is parallel to element C(I+2). In addition, the super-expressions of these two sequences, super-expressions 708 and 710 contain the same operator *. This means that the result of computing expression B(I+1)*C(I+2) can be carried over to the next iteration and used for expression B(I)*C(I+1).

Furthermore, none of the above references are being referenced elsewhere without its parallels. Therefore, there is no need to maintain values of these references between iterations and instead the computed result may be relied upon.

The mechanism of the present invention uses the referenced-by relationship given by the Lattice to obtain all the common ancestors of the parallel elements. In particular, the referenced-by bit vectors are ANDed together. The mechanism of the present invention then determines whether any of these common ancestors belongs to the family of expressions defined and whether all the parallel elements have common ancestors with the same operators. An extended set of sequences that contain both first-order and maximized expressions are obtained after the common ancestors are determined.

The last step of the analysis phase is eliminating redundant sequences. The mechanism of the present invention determines whether there is any sequence that is covered by other sequences, given a set of maximized and first order references. By eliminating redundant sequences, the number of registers required to maintain values between iterations is reduced.

After the analysis phase, the mechanism of the present invention applies transformations to the program code and generates an optimized program with second-order predictive commoning. The mechanism of the present invention first determines whether to perform an unrolling transformation based on register pressure estimates. Unrolling has the benefit of eliminating register copies at the end of each iteration. However, unrolling may increase register pressure and copying values between registers should be a lot cheaper than spilling registers.

Heuristically, the mechanism of the present invention determines whether to unroll based on pre-transformation register pressure estimates for the loop. If the register pressure is high, no unrolling will be performed. If the register pressure is too high, transformation will be avoided altogether, since not enough registers can benefit from it.

After the determination of whether to unroll, the mechanism of the present invention adds temporary variables that represent the sequence elements to the program code. For every sequence of sub-expressions from the final set of sequences, temporary variables are added that would eventually be mapped to registers. The number of variables added depends on the length of the sequence and its density. The values need to be stored and interleaved in such a way that they can be reused in subsequent iterations.

Turning now to FIG. 8, an example of adding temporary variables representing sequence elements is depicted in accordance with a preferred embodiment of the present invention. As depicted in FIG. 8, loop 802 includes expression A(I)=B(I−1)+B(I+1) 803. The mechanism of the present invention identifies sequence B(I−1) 804 and B(I+1) 806 with a length of 2 and distance of 2. Since the distance is 2, the mechanism of the present invention creates 4 temporary variables to hold the intermediate values, two variables for each element. In this example, R1 and R2 are created for element 804. R3 and R4 are created for element 806.

The distance of the sequences affects the need to unroll. For sequences with a distance of greater than 1 would require unrolling by at least the sequence density. In case of register pressure being too high, sequences with a distance of 1 would not require unrolling.

After temporary variables are added, the mechanism of the present invention inserts temporary variable initializations to provide start values for the registers, such that these values may propagate through the loop iterations. The mechanism of the present invention first distinguishes between feeder and non-feeder references. A feeder reference is a reference that is accessed for the very first time in the current iteration and has not been accessed by any of the immediately preceding iterations. Feeder references are the front of the propagation wave of values that are loaded and passed onto the subsequent iterations through registers.

In the above example, the distance of the sequences is 2, which means that there are two interleaved sequences of memory references being accessed in the loop. The last element in the sequence is marked as the feeder and the mechanism of the present invention then proceeds to create initializations for all the temporary variables that were added previously, except for the feeders. Using the example above, the last element in the sequence is B(I+1) 806. Therefore, R3 and R4 are marked as feeder references.

After marking the feeder references, the mechanism of the present invention inserts temporary variable initializations by replacing the induction variable reference in the non-feeder sequence with the lower bound+distance factor.

Turning now to FIG. 9, an example of applying transformation with predictive commoning is depicted in accordance with a preferred embodiment of the present invention. This example illustrates a transformation of loop 802 in FIG. 8. As depicted in FIG. 9, temporary variable R1, which belongs to a non-feeder sequence B(I−1), is added and initialized by replacing the induction variable I with the lower bound 2 resulting in R1=B(2−1) or R1=B(1) 902.

Temporary variable R2, which also belongs to non-feeder reference B(I−1), is added and initialized by replacing the induction variable I with a lower bound+1 resulting in R2=B(2+1−1) or R2=B(2) 903.

Once the temporary variables are added and initialized, feeder statements are inserted with special handling for maximized expressions by the mechanism of the present invention. Feeder statements are statements that compute values that will be propagated though loop iterations using registers.

Depending on the computed maximized sequences, temporary variables that are added were targeted at replacing sub-expressions, such as memory references or computations. To create feeder statements, sub-expressions that would be replaced by feeder temporary variables are used to generate code that computes and stores result in the feeder temporary variable. In the above example, feeder statements 904, 906, 908 and 910 are inserted to store result in the feeder temporary variables R3, R4, R1 and R2.

For the maximized re-associable expression with an operator op from the family of expressions described previously, an expression op(r1, r2, . . . rN) is created to compute and store the result of the re-associable expression in the temporary feeder variable.

After inserting the feeder statements, the mechanism of the present invention replaces sub-expressions with temporary variable references with special handling for maximized expressions. With the temporary variables set to contain values that are referred to in the sequences that were detected, the mechanism of the present invention replaces the references to sequence elements with references to the temporary variables. In the above example, references to sequence elements B(I+1) and B(I−1) are replaced with references to temporary variables R3 905, R4 907, R1 909 and R2 911.

When handling a maximized re-associable expression op(r1, r2 . . . rN), the mechanism of the present invention selects a representative from the references r1, r2, . . . , rN and replace the reference with the appropriate temporary variable. Other references are replaced with an operator neutral. For example, addition expressions, such as r1+r2+ . . . +rN, r1 is replaced with a temporary variable and r2 . . . rN are replaced with 0, since x+0=x. Multiplication expressions, such as r1. r2 . . . rN, r1 is replaced with the temporary variable and r2 . . . rN are replaced with 1, since x.1=x. Minimum expressions, such as min(r1, r2, . . . rN), and maximum expressions, such as max(r1, r2, . . . rN), r1, r2, . . . rN are replaced with the temporary variable, since min(x,x)=max(x,x)=x.

In addition to addition, multiplication, minimum and maximum expressions of consecutive elements, references r1, r2 . . . rN may be other references within a large op expressions with different associations. The symbolic simplifier takes care of folding redundant constants and minimum and maximum expressions and this transformation takes care of the need for re-associating expressions.

Finally, if the mechanism of the present invention determines to unroll in order to avoid register copies, unrolled iterations are created to perform software register renaming, by managing the temporary variables in an array and rotating the array on every iteration. In this way, there is no need to copy values from variable to variable in order to maintain correct values in the variables upon entry to the next iteration of the loop. In the above example, unrolled iterations are illustrated by expressions 912, 914, 916, and 918.

On the other hand, if the mechanism of the present invention determines not to unroll, every iteration assumes that all the temporary variables, except for the feeders that contain previously computed values, and feeders need to be computed. The values will need to be copied between temporary variables.

For example, if R1, R2 . . . , Rn are N number of temporary variables created for sequence S, where R1 represents the first element of the sequence, R2 represents the second element of the sequence. RN is marked as a feeder. At the end of the loop body, copy operations are generated, which include R1=R2, R2=R3, . . . , Rn−1=Rn.

The order in which copy operations are generated is important in that R2 cannot be overwritten before its value is transferred to R1. As the generated code will contain a feeder statement at its top, Rn would be assigned a new value when the next iteration of the loop starts.

Turning now to FIG. 10, a diagram illustrating an exemplary original loop nest from the 'psinv' subroutine in mgrid of the SPEC2000 benchmark is depicted in accordance with a preferred embodiment of the present invention. As depicted in FIG. 10, program 1000 contain opportunities for second-order predictive commoning, because it includes sub-expressions that carry combined sum of certain memory elements over to the next iteration.

For example, program 1000 includes innermost loop 1002. The induction variable of loop 1002 is I1. Examining the sequences of references in the dimensions controlled by I1, sequence R(I1−1, I2, I3), R(I1, I2, I3), and R(I1+1, I2, I3) uses values that can be reused in the immediate subsequent iterations. This sequence is a first-order sequence, since it contains only memory references.

In addition, some results of computations can be collected and reused in the immediately subsequent iterations as well. These computations are emphasized in program 1020.

During the analysis phase, the mechanism of the present invention collects the induction variable references in program 1020 into a half Lattice and determines the distances between sub-expressions.

The mechanism of the present invention then detects sequences with maximal coverage by using a limited form of algorithm for efficiently detecting maximal homogeneous numerical sequences, which is described in further details later in this application.

In program 1020, 9 sequences of a length of 3 and a distance of 1 are detected as follows:

1. R(I1−1, I2−1, I3−1), R(I1, I2−1, I3−1), R(I1+1, I2−1, I3−1)
2. R(I1−1, I2, I3−1), R(I1, I2, I3−1), R(I1+1, I2, I3−1)
3. R(I1−1, I2+1, I3−1), R(I1, I2+1, I3−1), R(I1+1, I2+1, I3−1)
4. R(I1−1, I2−1, I3), R(I1, I2−1, I3), R(I1+1, I2−1, I3)
5. R(I1−1, I2, I3), R(I1, I2, I3), R(I1+1, I2, I3)
6. R(I1−1, I2+1, I3), R(I1, I2+1, I3), R(I1+1, I2+1, I3)
7. R(I1−1, I2−1, I3+1), R(I1, I2−1, I3+1), R(I1+1, I2−1, I3+1)
8. R(I1−1, I2, I3+1), R(I1, I2, I3+1), R(I1+1, I2, I3+1)
9. R(I1−1, I2+1, I3+1), R(I1, I2+1, I3+1), R(I1+1, I2+1, I3+1)

After sequences with maximal coverage are detected, the mechanism of the present invention maximizes sub-expressions by first defining a family of re-associable expressions, which are expressions whose results are not affected even if the order of the elements is changed.

In program 1020, first-order sequences include:

1. R(I1−1, I2, I3)
2. R(I1, I2, I3)
3. R(I1+1, I2, I3)

Other combinable sequences include:

4. R(I1−1, I2−1, I3)+R(I1−1, I2+1, I3)+R(I1−1, I2, I3−1)+R(I1−1, I2, I3+1)
5. R(I1, I2−1, I3)+R(I1, I2+1, I3)+R(I1, I2, I3−1)+R(I1, I2, I3+1)
6. R(I1+1, I2−1, I3)+R(I1+1, I2+1, I3)+R(I1+1, I2, I3−1)+R(I1+1, I2, I3+1)
7. R(I1−1, I2−1, I3−1)+R(I1−1, I2+1, I3−1)+R(I1−1, I2−1, I3+1)+R(I1−1, I2+1, I3+1)
8. R(I1, I2−1, I3−1)+R(I1, I2+1, I3−1)+R(I1, I2−1, I3+1)+R(I1, I2+1, I3+1)
9. R(I1+1, I2−1, I3−1)+R(I1+1, I2+1, I3−1)+R(I1+1, I2−1, I3+1)+R(I1+1, I2+1, I3+1)

After the analysis phase, the mechanism of the present invention applies transformation to program 1020 to create second-order predictive commoning optimization. Turning now to FIG. 11, a diagram illustrating an exemplary optimized loop nest of the 'psinv' subroutine after applying transformation with second-order predictive commoning is depicted in accordance with a preferred embodiment of the present invention.

As depicted in FIG. 11, program 1100 is an optimized version of program 1020 in FIG. 10. The mechanism of the present invention adds 9 temporary variables, R0-R8, to program 1020. Since the distance between elements of the sequence is 1, one temporary variable is created for each element in the sequence.

The mechanism of the present invention then proceeds to initializes temporary variables 1102 and inserts feeder statements 1104, 1106 and 1108. Next, the mechanism of the present invention replaces references to sequence elements in program 1020 with references to temporary variables 1110, 1112, and 1114.

Finally, unrolling is performed by the mechanism of the present invention as determined. As shown in FIG. 11, temporary variables R3, R4 and R5 are rotated in references 1110, 1112, and 1114.

In summary, the present invention has advantages over existing solutions in that computations, such as floating point add operations, are saved in addition to reducing the number of memory access required in a program loop. In this way, the performance of the program is enhanced. Furthermore, the present invention handles multiple sequences with different lengths and instances within the same loop. This allows optimization transformations to be performed on a large variety of codes.

The following sections describe the algorithm for the efficiently detecting maximal homogeneous numerical sequences. This algorithm is aimed to detect homogeneous, or fixed distance, sequences of indexes in a set of indexes, such that values loaded from memory through these indexes may be stored into the registers to be reused in subsequent iterations of loops.

Identifying these sequences becomes even more complicated if the distance is not equal to 1 or when multiple sequences are running through an iteration of the loop. For example, a loop, such as the following, includes three sequences running through an iteration:

```
DO i=1, n
    b[i] = c1*(a[i+1]+a[i+5])+c2*(a[i+2]+a[i+3])
END DO
```

By analyzing the sequence of indexes being accessed, a[i] in one iteration will be re-accessed as a[i−1] in the subsequent iteration. Similarly, a[i+1] in one iteration will be re-accessed as a[i] in the subsequent iteration (and then again as a[i−1] in the iteration after that). We identified the sequence of indexes to be (−1,0,1) with a fixed distance of 1.

Storing the loaded values into registers, the code is transformed to look like:

```
r1=a[1]
r2=a[2]
DO i=2, n
   r3=a[i+1]
   b[i] = c1*(r1+r3)+c2*r2
   r1=r2
   r2=r3
END DO
```

Instead of having three load operations in every iteration of the loop, we only have one load, and two register copies.

This algorithm efficiently detects all maximal homogeneous numerical sequences in a set. Numerical sequences are sequences of indexes with a fixed distance between them. This algorithm may be implemented in compilers, such as IBM XL Fortran and IBM XL C/C++ compilers. The complexity of this algorithm is $O(n^3)$ average time, where n is the size of the set of indexes.

The following are basic definitions that form basic building blocks of the algorithm.

Homogeneous Numerical Sequence

Homogeneous numerical sequence (HNS) is a sequence of numbers with the same fixed distance between two consecutive numbers. The numbers are ordered from the smallest to the largest.

We define a Homogeneous Numerical Sequence (HNS) as a sequence of integers $(i_1, i_2, \ldots, i_n)$ where $\{i_1, i_2, \ldots, i_n\} \subset Z$, $n \geqq 2$ and exists $d \in N$; $d \neq 0$ such that for every $j \in 1, 2, \ldots, n-1$, $d = i_{j+1} - i_j$.

HNS may be represented by H(b, d, n) where b is the smallest element of the sequence or the base, d is the distance between the two consecutive elements, and n is the number of elements in the sequence. By using the values b, d, and n, numbers in the sequence or $i_j$−b+(j−1)·d, can be easily reproduced.

HNS Membership

It defines $$i \in H(b, d, n) <==> \mathrm{mod}(i-b, d)=0 \hat{} I \geqq b \hat{} i < b+n \cdot d \tag{1}$$

Where $$\mathrm{mod}(x, y)=x-y[x/y] \tag{2}$$

That is, similar to the way we can reproduce any member of the sequence using only b, d, and n from the short-from representation, these values are used to easily determine whether a given number is a member of a sequence described by these values.

HNS-Set(A)

Given a set $A \subset Z$, it defines $$\text{HNS-Set}(A)=\{H(b, d, n) \mid \{i \mid i \in H(b, d, n)\} \subseteq A\} \tag{3}$$

In other words, HNS-Set(A) will be the set of all the possible Homogeneous Numerical Sequences of A.

HNS Inclusion

Given two Homogeneous Numerical Sequences $H_1(b_1, d_1, n_1)$ and $H_2(b_2, d_2, n_2)$ it defines $$b_1 \in H_2 \hat{}$$

$$H_1 \subseteq H_2 <==> b_1+(n_1-1)d_1 \in H_2 \hat{} <==> \{i \mid i \in H_1\} \subseteq \{i \mid i \in H_2\} \tag{4}$$

$$\mathrm{mod}(d_1, d_2)=0$$

That is, $H_1$ is included by $H_2$ if all the members of the Homogeneous Numerical Sequence $H_1$ appear in the Homogeneous Numerical Sequence $H_2$.

It follows from equations (1) and (4) above, that inclusion of two Homogeneous Numerical Sequences can be determined in O(1) time.

Maximal HNS

Given a set $S=\{H_1, H_2, \ldots, H_n\}$ of Homogeneous Numerical Sequences, $H_j \in S$ will be called maximal in S if there is no $k \in 1, 2 \ldots, n$ such that $k \neq j \hat{} H_j \subseteq H_k$ Maximal(S)

Given a set $S=\{H_1, H_2, \ldots, H_n\}$ of Homogeneous Numerical Sequences, it defines $$\mathrm{Maximal}(S)=\{H \in S \mid H \text{ is maximal in } S\} \tag{5}$$

That is, Maximal(S) will be the set of all the maximal Homogeneous Numerical Sequences in S.

Longest HNS

Given a set S={$H_1$, $H_2$, . . . , $H_n$} of Homogeneous Numerical Sequences, say that H(b, d, n) is longest in S if $$H(b, d, n)\in\text{Maximal}(\{H'(b', d', n')\in S|d'=d\}) \quad (6)$$

In other words, if we look at a sequence H(b, d, n) and we cannot add anymore elements to it (from A), then we can not make it longer—that would make it longest. To understand the definition above, for a given distance d look at the subset of S that includes all the sequences from S with a distance d.

In that subset, if we examine two sequences that share any elements between them, then there should be a sequence in the subset that includes both of them. That sequence will be longer. Therefore, the maximal sequences in the subset are longest.

From the definitions above, it follows that any maximal sequence is also longest. However, there may be longest sequences that are included by some other sequence (with a smaller distance d) and therefore, not all longest sequences are maximal (See also Example 1 below).

Longest-HNS-Subset(S)

Given a set S={$H_1$, $H_2$, . . . , $H_n$} of Homogeneous Numerical Sequences, we define $$\text{Longest-HNS-Subset}(S)=\{H\in S|H \text{ is longest in } S\}$$

This, of course, defines a subset of S that includes all the Homogeneous Numerical Sequences that are longest.

Maximal-HNS-Set(A)

Given a set A⊂Z, it defines $$\text{Maximal-HNS-Set}(A)=\text{Maximal}(\text{HNS-Set}(A)) \quad (7)$$

That is, given a set of numbers A, Maximal-HNS-Set(A) would be defined as the set of all the Homogeneous Numerical Sequences of A that are maximal.

It is easy to see that for a given set S of Homogeneous Numerical Sequences, every HNS that is maximal in S, is also longest in S, and therefore Maximal (HNS-Set(A))=Maximal (Longest-HNS-Subset(A)).

EXAMPLE 1

Given a set A={1, 2, 3} the following apply according to the definitions above:

HNS-Set(A)={(1, 2), (1 3), (2, 3), (1, 2, 3)}. Using the short-form representation we can describe this set as {H(1, 1, 2),H(1, 2, 2),H(2, 1, 2),H(1, 1, 3)}

Longest-HNS-Subset(HNS-Set(A))={H(1, 2, 2),H(1, 1, 3)}

Maximal-HNS-Set(HNS-Set(A))={H(1, 1, 3)}

EXAMPLE 2

Given a set A={1, 5, 2, 3}, the following apply according to the definitions above:

Members of HNS-Set(A) include H(1, 1, 2)=(1, 2), H(1, 2, 2)=(1, 3), and H(1, 2, 3)=(1, 3, 5)

Maximal-HNS-Set(A)={H(1, 1, 3), H(1, 2, 3), H(2, 3, 2)}={(1, 2, 3), (1, 3, 5), (2, 5)}

EXAMPLE 3

Given a set A={1, 2, 4, 8} the following apply according to the definitions above:

There is no H(b, d, n) in HNS-Set(A) such that n>2.

The number of sequences in Maximal-HNS-Set(A) is n(n−1)/2, where n=|A|.

```
Algorithm 1 Compute-Table-Of-Sets (A)
Input: A a set of numbers.
Output: T a table of sets of numbers, such that
  y ∈ T(d) <==> ∃x ∈ T(d), y − x = d v x − y = d
  1. For every (i1, i2) ∈ A x A
     a. if i2 > i1
     (1) d ←i2 − i1
     (2) if T(d) exists in T, then
        T(d) ←T(d) ∪ {i1, i2}
        otherwise,
        T(d) ←{i1, i2}
  2. return T
```

Given a HNS-Set(A), all the maximal Homogeneous Numerical Sequences in it may be detected. The process may be simplified by first detecting all the longest Homogeneous Numerical Sequences.

As mentioned earlier, the subset of HNS-Set(A) that contains only the longest Homogeneous Numerical Sequences suffices for finding the maximal Homogeneous Numerical Sequences.

Computing Table of Sets

The process of finding the longest Homogeneous Numerical Sequences begins as described by Algorithm 1. The motivation for this, is that numbers will be in T(d) if and only if they belong to some Homogeneous Numerical Sequence of A with a distance d.

Time Complexity Analysis of Algorithm 1

Algorithm 1 iterates through all the pairs in A×A. If it defines n=|A| then the number of iterations is bound by $n^2$.

By implementing T as a Hash-table [ref] of Hash-tables of {key∈A, data=∈}, the cost of adding elements, and testing for elements is put at average O(1) time. The overall time complexity of Algorithm 1 is therefore average $O(n^2)$.

Computing All Longest Homogeneous Numerical Sequences

Once the numbers have been distributed by distance into sets (or, distance groups), the longest Homogeneous Numerical Sequences is found for every distance d, the sequences are collected by choosing some representative from T(d), and elements from T(d) are added to a sequence, while the elements from T(d) are removed (See Algorithm 2).

In addition to building a set of all longest Homogeneous Numerical Sequences, the algorithm also produces a table M that records for each number, all of the Homogeneous Numerical Sequences it belongs to. The purpose of that table should become clear in the next section, where we compute all the maximal Homogeneous Numerical Sequences.

To solidify the efficiency of the algorithm, a few simple Lemma is proved, and then combine into showing the overall time complexity of the algorithm.

Lemma 1 For every distance d, and i∈A, there is at most one H(b, d, n)∈ Longest-HNS-Subset(A) such that i∈H(b, d, n).

Proof Assuming to the contrary that $i\in H_1(b_1, d, n_1)$ and $i\in H_2(b_2, d, n_2)$, where $\{H_1,H_2\}\subseteq$Longest-HNSSubset(A), and without restricting generality, let j be the smallest such that j>i and that $j\in H_2$ and $j\notin H_1$. If $j-d\notin A$, then by the definition of HNS and i, $i\notin H_2$-contradiction. Otherwise, $j-d\in H_2$ and $j-d\in H_1$, and since j can be added to $H_1$ this contradicts the assumption that $H_1\in$Longest-HNSSubset(A).

Lemma 2 For every $i\epsilon A$, i is a member of at most $\|A\|$ sequences in Longest-HNS-Subset(A).

Proof For every $i\epsilon A$ there are at most $|A|-1$ relevant distances for i (the distances between i and any other member of A). By the previous lemma, for every d there is at most 1 Homogeneous Numerical Sequence in Longest-HNS-Subset(A) that includes i.

Lemma 3 Given A, and S=Longest-HNS-Subset(A), then $\forall H_j(b_j, d_j, n_j)\epsilon S$ and $\forall H_k(b_k, d_k, n_k)\epsilon S$; the following holds:

$$H_j \subseteq H_k => b_j \epsilon H_k \tag{8}$$

Proof $H_j - H_k => \{i|I\epsilon H_j\} \subseteq \{i|i\epsilon H_k\} => b_j \epsilon H_k$ Lemma 4 Given A, and S=Longest-HNS-Subset(A), then $|S| \leqq |A|^2$.

Proof From Lemma 1 and the definition of Homogeneous Numerical Sequence, it follows that for every pair of numbers $i_1, i_2 \epsilon A, i_2 > i_1$, there is only one Homogeneous Numerical Sequence $H(b, d, n)\epsilon S$, such that $d=i_2-i_1$ and $i_1, i_2 \epsilon H$. The number of pairs of elements from A is bound by $|A|^2$, therefore the number of sequences in S is bound by $|A|^2$.

Time Complexity Analysis of Algorithm 2

It would be easier to show the time complexity of Algorithm 2, if we look at the elements of A in pairs. That is, there are at most $|A|^2$ pairs in A×A. Algorithm 1 distributed numbers into groups according to the distance between them, so we can look at pairs of numbers in each T(d). For example, for the set A={1, 2, 3}, Algorithm 1 would create the following table:

| distance | members | viewed as pairs |
|---|---|---|
| 1 | 1, 2, 3 | (1, 2), (2, 3) |
| 2 | 1, 3 | (1, 3) |

```
Algorithm 2 Compute-longest-HNS-Subset (A)
Input: A a set of numbers.
Output:
1) S a set of all longest Homogeneous Numerical Sequences
     of A
2) M a table of sets of Homogeneous Numerical Sequences
     such that M(i) = {H ∈ S|i ∈ H}
1. T ←Compute-Table-Of-Sets (A)
2. while T is not empty
a. d ←next key of T, such that T(d) exists in T
b. while T(d) is not empty
(1) Pick some element i ∈ T(d)
(2) b ←i
(3) n ←1
(4) T(d) ←T(d) \ {i}
(5) j ←i + d
(6) while j ∈ T(d)
   (a) n ←n + 1
   (b) T(d) ←T(d) n fjg
   (c) j ←j + d
(7) j ←i − d
(8) while j ∈ T(d)
   (a) n ←n + 1
   (b) b ←j
   (c) T(d) ←T(d) \ {j}
   (d) j ←j − d
(9) s ←H(b, d, n)
(10) S←S ∪ {s}
(11) j ←0
(12) while j < n
   (a) if M(b + d . j) is exists in M, then
          M(b + d . j) ←M(b + d . j) ∪ {s}
```

-continued

```
     otherwise,
          M(b + d . j) ←{s}
   (b) j ←j + 1
(13) Remove T(d) from T
3. return (S,M)
```

Algorithm 2 scans each distance group, locates some member (can be done in O(1) time), and start adding elements according to distance (can be done in average O(1) time for each element, due to the need to test whether the element is in the set, and the set is implemented as a Hash-table, as mentioned above).

Also, finding the next distance group in T can be done in O(1) time, if the groups are linked in a Linked List in addition to hashing them into T. Since every iteration of the algorithm removes elements of some distance group in T and the algorithm stops when Tis empty, the time complexity of the algorithm is bound by the total number of elements that exist in all the distance groups in T.

As can be seen in the algorithm, the innermost iterations at lines 1.b.(6) and 1.b.(8) remove elements from some T(d), while the iterations on line 1.b.(12) mark the removed elements as belonging to the newly created Homogeneous Numerical Sequence, by updating the M structure. Implementing the M structure as a Hash-table of sets, enables us to do that at average O(1) time complexity per element.

From the complexity analysis of Algorithm 1 it follows that the number of elements in all the distance groups in T is bound by $|A|^2$. That puts the time complexity of Algorithm 2 at average $O(n^2)$, where $n=|A|$.

Detecting Maximal Sequences

The algorithm's approach for detecting the maximal sequences, given all the longest ones, is to simply test inclusion between sequences, and eliminate any sequences that are included by other sequences.

Algorithm

To do that efficiently (instead of just attempting to test inclusion between every two sequences), the information gathered by Algorithm 2 in the M data-structure is used. That is, when testing whether a sequence is included by other sequences, it is only interested in testing against sequences that contain its base.

By the opposite of equation (8) in Lemma 3, it may be determined that any sequence that does not contain the base of the sequence being tested does not include that sequence, so there is no need to test against such sequences. The algorithm initializes R with all the longest sequences, and proceeds to remove any that are not maximal, i.e. any that are included by some other sequence in R.

```
Algorithm 3 Maximal-HNS-Set (A)
Input: A a set of numbers.
Output:R a set of all Maximal Homogeneous Numerical
Sequences of A
1. (S,M) ←Compute-longest-HNS-subset (A)
2. R ←S
3. For every H(b, d, n) ∈ S
a. For every H'(b', d', n') ∈ M(b)
     (1) if H(b, d, n) ⊆H' (b', d', n'), then
          R ←R \ {H(b, d, n)}
4. return R
```

Complexity Analysis

As stated in the basic definition of HNS, the sequence inclusion test can be done in O(1) complexity. In addition,

- The maximal length of any sequence is n=|A|
- The number of longest Homogeneous Numerical Sequences $|S=\text{Longest-HNS-Subset}(A)| \leqq n^2$ (see Lemma 4)
- By Algorithm 3 and Lemma 2, every sequence gets tested for inclusion against at most n sequences.
- Therefore, the number of inclusion tests would be bound by $n_3$.
- With M being a Hash-table, the access to M would be average O(1) complexity.
- The time complexity of Algorithm 2 (being called from Algorithm 3) is average $O(n^2)$ All of the above, puts the complexity of Algorithm 3 at average $O(n^3)$.

Minimizing the Number of Sequences

For our purpose of using these sequences in the context of optimization transformation, some additional requirements are that the Homogeneous Numerical Sequences will be as dense as possible, and as long as possible (with priority given to denseness). These two parameters directly affect the register pressure in the transformed code.

To define this extension to the problem more precisely, all the sequences in R that have all their members belong to some other sequence that remains in R are removed.

Algorithm

Given the result from Algorithm 3, the result set according to the above requirements may be effectively and efficiently minimize, by sorting the set according to distance and length, and then proceeding to remove any sequences whose members belong to sequences remaining in the result set, as described in Algorithm 4.

EXAMPLE 2 REVISITED

If the result set from Example 2 is examined, the sequence containing the elements (2, 5) has the greatest distance, and all its elements belong to some "later" (i.e. sequences with a smaller distance) sequence.

Applying Algorithm 4, the sorted order of the sequences would be:

(2, 5), (1, 3, 5), (1, 2, 3)

or in the short form representation:

H(2, 3, 2),H(1, 2, 3),H(1, 1, 3)

```
Algorithm 4 Maximal-Coverage (R)
Input: R a set of Maximal Homogeneous Numerical Sequences
Output:V a minimized list of HNS with maximal coverage
1. V ← Sort R by d descending and n ascending
2. for each H(b, d, n) ∈ V
a. for each i ∈ H(b, d, n)
  (1) if C(i) exists in C, then C(i) ← C(i) + 1
        otherwise, C(i) ← 1
3. for each H(b, d, n) in V according to the ordering in V
  a. covered ← true
  b. for each i ∈ H(b, d, n)
  (1) if C(i) = 1, then covered ← false
  c. if covered = true
  (1) for each i ∈ H(b, d, n)
        (a) C(i) ← C(i) − 1
  (2) remove H(b, d, n) from V
4. Return V
```

Following the algorithm, we see that 2∈H(1, 1, 3) and 5∈H(1, 2, 3) so we proceed to remove H(2, 3, 2) from the result set. The rest of the elements can not be removed, so the final minimized result (or maximal coverage result) will be:

H(1, 2, 3), H(1, 1, 3)

EXAMPLE 3 REVISITED

Applying the same process to Example 3, the result set $$\text{Maximal-HNS-Set}(\{1, 2, 4, 8\}) = \{(1, 2), (1, 4), (1, 8),\ (2, 4), (2, 8),\ (4, 8)\}$$

Applying the sorting stage of the algorithm, the sorted set would be:

(1, 8), (2, 8), (4, 8), (1, 4), (2, 4), (1, 2)

Sequences as in Algorithm 4 are removed:

~~(1, 8)~~, ~~(2, 8)~~, (4, 8), ~~(1, 4)~~, ~~(2, 4)~~, (1, 2)

The resulting minimized set includes the lines with shortest distances that cover all the points in the input set. Since the sorting order for these requirements is not unique (i.e. there is a level of freedom for choosing the order of sequences that have the same length and same distance), there could be more than one result that satisfies the requirements. For our purpose, any result that satisfies these requirements suffices.

Time Complexity Analysis of Algorithm 4

As shown above, the number of sequences in the result set R of Maximal-HNS-Set(A) is bounded by $O(n^2)$, where n=|A|. Sorting can be done in O(m·log(m)) [ref], therefore sorting the result set can be done in $O(n^2 \cdot \log(n^2)) = O(n^2 \cdot 2 \cdot \log(n)) = O(n^2 \cdot \log(n))$.

The next phase of the algorithm scans through all the sequences in V (bounded by $O(n^2)$) and through all the members of each sequence (bounded by O(n)) and creates a "reference count" for each number. Using a Hash-table C, we can average the creation, location, and update of elements in C at O(1), which yields an overall average time complexity of $O(n^3)$ for this phase.

The final phase of the algorithm does a similar scan, while removing sequences from the list V and updating the reference counts, which also puts its average time complexity at $O(n^3)$, which is also the overall time complexity of the algorithm (including computing the Maximal HNS Set R, as we showed in the previous section).

In conclusion, an efficient ($O(n^3)$ average time complexity) algorithm for detecting maximal homogeneous numerical sequences in a set of integer numbers is shown. The algorithms shown here can be easily extended to handle multi-dimensional indexes (by defining the elements and the distances as vectors) without affecting its time complexity.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave-transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for second-order predictive commoning, the method comprising:

collecting at least one induction variable reference from a software program, wherein the software program includes at least one loop, wherein the collecting comprises:

examining expressions and sub-expressions of an innermost loop of the at least one loop;

organizing the expressions and the sub-expressions into a half Lattice; and maintaining a set of attributes for the expressions and the sub-expressions, wherein the set of attributes includes immediately-referenced-by, immediately-references, referenced-by, and references, and wherein the immediately-referenced-by attribute represents a set of all sub-expressions in the half Lattice that immediately reference a node's sub-expression, the immediately-references attribute includes a set of all sub-expressions in the half Lattice that are immediately referenced by the node's sub-expression, the referenced-by attribute includes all sub-expressions that contain a reference to the node's super-expression, and the references attribute includes all sub-expressions that the node's sub-expression references;

determining at least one distance between a plurality of sub-expressions within the at least one loop, wherein the at least one distance is a number of iterations in the at least one loop;

detecting at least one sequence from a plurality of sequences with a maximal coverage using the at least one distance, wherein the detecting comprises:

distributing the plurality of sequences into a plurality of distance groups;

determining a largest sequence within each group;

filtering out at least one first sequence covered by another sequence; and filtering out at least one second sequence covered by a subset of remaining sequences in the plurality of sequences prioritized by density and length of the sequence;

maximizing at least one sub-expression from the plurality of sub-expressions in the at least one sequence using the at least one induction variable reference, wherein the maximizing comprises:

defining a family of re-associable sub-expressions, wherein a re-associable sub-expression is one of a multiplication, an addition, a minimum, and a maximum expression; and identifying parallel elements from the plurality of sequences that are members of common super-expressions, wherein the plurality of sequences are of a same length and distance, and wherein the common super-expressions use the same operator as the family of re-associable expressions;

eliminating a redundant sequence from the plurality of sequences to form a set of maximized sequences, wherein the eliminating comprises:

determining if at least one sequence is covered by another sequence of the plurality of sequences; and if the at least one sequence is covered by another sequence of the plurality of sequences, removing the at least one sequence from a result set of sequences;

determining whether to perform unrolling on the set of maximized sequence based on register pressure estimates for the at least one loop;

adding at least one temporary variable to the software program, wherein the at least one temporary variable represents at least one element of a plurality of elements in the at least one sequence;

inserting at least one initialization for the at least one temporary variable to the software program;

inserting at least one feeder statement to the software program, wherein the feeder statement stores a result of at least one sub-expression to the at least one temporary variable;

replacing the at least one sub-expression with a reference to the at least one temporary variable, wherein the replacing comprises:

selecting a representative reference from the at least one sub-expression for a maximized re-associable expression;

replacing the representative reference with a value of zero if the at least one sub-expression is an addition expression;

replacing the representative reference with a value of one if the at least one sub-expression is an multiplication expression;

replacing the representative reference with the at least one temporary variable if the at least one sub-expression is one of a minimum and a maximum expression; and replacing other references with a neutral operator;

responsive to determining that unrolling is to be performed, rotating the reference to the at least one temporary variable to create an unrolled iteration; and responsive to determining that no unrolling is to be performed, rotating a value of the at least one temporary variable.

2. A data processing system including one or more processors for second-order predictive commoning, the data processing system comprising:

means for collecting at least one induction variable reference from a software program, wherein the software program includes at least one loop, wherein the means for collecting at least one induction variable reference comprises:

means for examining expressions and sub-expressions of an innermost loop of the at least one loop;

means for organizing the expressions and the sub-expressions into a half Lattice; and means for maintaining a set of attributes for the expressions and the sub-expressions, wherein the set of attributes includes immediately-referenced-by, immediately-references, referenced-by, and references, and wherein the immediately-referenced-by attribute represents a set of all sub-expressions in the half Lattice that immediately reference a node's sub-expression, the immediately-references attribute includes a set of all sub-expressions in the half Lattice that are immediately referenced by the node's sub-expression, the referenced-by attribute includes all sub-expressions that contain a reference to the node's super-expression, and the references attribute includes all sub-expressions that the node's sub-expression references;

means for determining at least one distance between a plurality of sub-expressions within the at least one loop, wherein the at least one distance is a number of iterations in the at least one loop;

means for detecting at least one sequence from a plurality of sequences with a maximal coverage using the at least one distance, wherein the means for detecting at least one sequence comprises:

means for distributing the plurality of sequences into a plurality of distance groups;

means for determining a largest sequence within each group;

means for filtering out at least one first sequence covered by another sequence; and means for filtering out at least one second sequence covered by a subset of remaining sequences in the plurality of sequences prioritized by density and length of the sequence;

means for maximizing at least one sub-expression from the plurality of sub-expressions in the at least one sequence using the at least one induction variable reference, wherein the means for maximizing at least one sub-expression comprises:

means for defining a family of re-associable sub-expressions, wherein a re-associable sub-expression is one of a multiplication, an addition, a minimum, and a maximum expression; and means for identifying parallel elements from the plurality of sequences that are members of common super-expressions, wherein the plurality of sequences are of a same length and distance, and wherein the common super-expressions use the same operator as the family of re-associable expressions;

means for eliminating a redundant sequence from the plurality of sequences to form a set of maximized sequences, wherein the means for eliminating a redundant sequence comprises:

means for determining if at least one sequence is covered by another sequence of the plurality of sequences; and if the at least one sequence is covered by another sequence of the plurality of sequences, means for removing the at least one sequence from a result set of sequences;

means for determining whether to perform unrolling on the set of maximized sequence based on register pressure estimates for the at least one loop;

means for adding at least one temporary variable to the software program, wherein the at least one temporary variable represents at least one element of a plurality of elements in the at least one sequence;

means for inserting at least one initialization for the at least one temporary variable to the software program;

means for inserting at least one feeder statement to the software program, wherein the feeder statement stores a result of at least one sub-expression to the at least one temporary variable;

means for replacing the at least one sub-expression with a reference to the at least one temporary variable, wherein the means for replacing the at least one sub-expression with a reference to the at least one temporary variable comprises:

means for selecting a representative reference from the at least one sub-expression for a maximized re-associable expression;

means for replacing the representative reference with a value of zero if the at least one sub-expression is an addition expression;

means for replacing the representative reference with a value of one if the at least one sub-expression is an multiplication expression;

means for replacing the representative reference with the at least one temporary variable if the at least one sub-expression is one of a minimum and a maximum expression; and means for replacing other references with a neutral operator;

responsive to determining that unrolling is to be performed, means for rotating the reference to the at least one temporary variable to create an unrolled iteration; and responsive to determining that no unrolling is to be performed, means for rotating a value of the at least one temporary variable.

3. A computer program product in a computer recordable-type medium for second-order predictive commoning, the computer program product comprising:

first instructions for collecting at least one induction variable reference from a software program, wherein the software program includes at least one loop, wherein the first instructions comprises:

instructions for examining expressions and sub-expressions of an innermost loop of the at least one loop;

instructions for organizing the expressions and the sub-expressions into a half Lattice; and instructions for maintaining a set of attributes for the expressions and the sub-expressions, wherein the set of attributes includes immediately-referenced-by, immediately-references, referenced-by, and references, and wherein the immediately-referenced-by attribute represents a set of all sub-expressions in the half Lattice that immediately reference a node's sub-expression, the immediately-references attribute includes a set of all sub-expressions in the half Lattice that are immediately referenced by the node's sub-expression, the referenced-by attribute includes all sub-expressions that contain a reference to the node's super-expression, and the references attribute includes all sub-expressions that the node's sub-expression references;

second instructions for determining at least one distance between a plurality of sub-expressions within the at least one loop, wherein the at least one distance is a number of iterations in the at least one loop;

third instructions for detecting at least one sequence from a plurality of sequences with a maximal coverage using the at least one distance, wherein the third instructions comprises:

instructions for distributing the plurality of sequences into a plurality of distance groups;

instructions for determining a largest sequence within each group;

instructions for filtering out at least one first sequence covered by another sequence; and instructions for filtering out at least one second sequence covered by a subset of remaining sequences in the plurality of sequences prioritized by density and length of the sequence;

fourth instructions for maximizing at least one sub-expression from the plurality of sub-expressions in the at least one sequence using the at least one induction variable reference, wherein the fourth instructions comprises:

instructions for defining a family of re-associable sub-expressions, wherein a re-associable sub-expression is one of a multiplication, an addition, a minimum, and a maximum expression; and instructions for identifying parallel elements from the plurality of sequences that are members of common super-expressions, wherein the plurality of sequences are of a same length and distance, and wherein the common super-expressions use the same operator as the family of re-associable expressions;

fifth instructions for eliminating a redundant sequence from the plurality of sequences to form a set of maximized sequences, wherein the fifth instructions comprises:

instructions for determining if at least one sequence is covered by another sequence of the plurality of sequences; and if the at least one sequence is covered by another sequence of the plurality of sequences, instructions for removing the at least one sequence from a result set of sequences;

sixth instructions for determining whether to perform unrolling on the set of maximized sequence based on register pressure estimates for the at least one loop;

seventh instructions for adding at least one temporary variable to the software program, wherein the at least one temporary variable represents at least one element of a plurality of elements in the at least one sequence;

eighth instructions for inserting at least one initialization for the at least one temporary variable to the software program;

ninth instructions for inserting at least one feeder statement to the software program, wherein the feeder statement stores a result of at least one sub-expression to the at least one temporary variable;

tenth instructions for replacing the at least one sub-expression with a reference to the at least one temporary variable, wherein the tenth instructions comprises:

instructions for selecting a representative reference from the at least one sub-expression for a maximized re-associable expression;

instructions for replacing the representative reference with a value of zero if the at least one sub-expression is an addition expression;

instructions for replacing the representative reference with a value of one if the at least one sub-expression is an multiplication expression;

instructions for replacing the representative reference with the at least one temporary variable if the at least one sub-expression is one of a minimum and a maximum expression; and instructions for replacing other references with a neutral operator;

responsive to determining that unrolling is to be performed, eleventh instructions for rotating the reference to the at least one temporary variable to create an unrolled iteration; and responsive to determining that no unrolling is to be performed, twelfth instructions for rotating a value of the at least one temporary variable.

* * * * *